United States Patent
Asti et al.

(12) 
(10) Patent No.: US 7,730,726 B2
(45) Date of Patent: Jun. 8, 2010

(54) METHOD AND APPARATUS FOR CONTROLLING THE COMBUSTION IN A GAS TURBINE

(75) Inventors: Antonio Asti, Padua (IT); Mariateresa Paci, Florence (IT); Michele D'Ercole, Florence (IT); Massimo Betti, Empoli (IT); Simone Bei, Prato (IT); Giovanni Tonno, Florence (IT); Jesse Stewart, Taylors, SC (US); Francesco Maria Orgero, Florence (IT)

(73) Assignee: Nuovo Pignone S.p.A., Florence (IT)

( * ) Notice: Subject to any disclaimer, the term of this patent is extended or adjusted under 35 U.S.C. 154(b) by 0 days.

(21) Appl. No.: 12/116,486

(22) Filed: May 7, 2008

(65) Prior Publication Data
US 2008/0289339 A1 Nov. 27, 2008

(30) Foreign Application Priority Data
May 23, 2007 (IT) .......................... MI2007A1047

(51) Int. Cl.
*F02C 1/00* (2006.01)

(52) U.S. Cl. ..................................... 60/772; 60/39.465

(58) Field of Classification Search ................... 60/772, 60/736, 39.465
See application file for complete search history.

(56) References Cited

U.S. PATENT DOCUMENTS

| 4,139,157 | A | * | 2/1979 | Simmons ..................... 239/400 |
| 5,288,149 | A | * | 2/1994 | Meyer .......................... 374/36 |
| 5,882,115 | A | * | 3/1999 | Vander Heyden et al. ..... 374/37 |
| 6,082,092 | A | * | 7/2000 | Vandervort ................... 60/773 |
| 6,386,014 | B1 | * | 5/2002 | Butch ......................... 73/23.35 |
| 2004/0013987 | A1 | * | 1/2004 | O'Rear et al. .................. 431/2 |
| 2006/0185367 | A1 | * | 8/2006 | Hino et al. .................... 60/772 |
| 2007/0119178 | A1 | * | 5/2007 | Berenbrink et al. ........... 60/773 |

* cited by examiner

*Primary Examiner*—Michael Cuff
*Assistant Examiner*—Phutthiwat Wongwian
(74) *Attorney, Agent, or Firm*—Potomac Patent Group PLLC (57) ABSTRACT

A method and apparatus are described for controlling the combustion in a gas turbine. The method includes measuring, with one or two calorimeters, the temperature, calorific value and relative density of a gaseous fuel in order to determine the Wobbe index, comparing the Wobbe index value measured with a predefined Wobbe index value for the gaseous fuel and regulating the temperature of the gaseous fuel with at least one heat exchanger in order to reach the predefined Wobbe index value. The method may also include using a second gaseous fuel, having a different Wobbe index from the gaseous fuel, or a fuel obtained by mixing the gaseous fuel and the second gaseous fuel, according to arbitrary proportions and variable with time.

8 Claims, 6 Drawing Sheets

Fast shift from one gas to another

Fig. 1

MOLAR COMPOSITION OF GAS "H"

| Component | Average percentage |
|---|---|
| Ar | 0.06 |
| He | 0.03 |
| $N_2$ | 2.15 |
| $CH_4$ | 90.17 |
| $CO_2$ | 1.04 |
| $C_2H_6$ | 4.77 |
| $C_3H_8$ | 1.21 |
| $C_4H_{10}$ | 0.41 |
| $C_5H_{12}$ | 0.16 |
| Lower calorific value ($MJ/Nm^3$) | 37,35 |
| Upper calorific value ($MJ/Nm^3$) | 41,32 |
| Density ($kg/m^3$) | 0,80 |

MOLAR COMPOSITION OF GAS "G"

| Component | Average percentage |
|---|---|
| $N_2$ | 14.35 |
| $CH_4$ | 81.30 |
| $CO_2$ | 0.89 |
| $C_2H_6$ | 2.85 |
| $C_3H_8$ | 0.37 |
| $C_4H_{10}$ | 0.14 |
| $C_5H_{12+}$ | 0.09 |
| Lower calorific value ($MJ/Nm^3$) | 31,7 |
| Upper calorific value ($MJ/Nm^3$) | 35,1 |
| Density ($kg/m^3$) | 0,833 |

NORMAL START-UP

Fast shift from one gas to another

Fig. 5

Fig. 6
Normal functioning

METHOD AND APPARATUS FOR CONTROLLING THE COMBUSTION IN A GAS TURBINE

BACKGROUND OF THE INVENTION

1. Field of the Invention

The present invention relates to a method and apparatus for controlling the combustion in a gas turbine and, more specifically, a method and apparatus for controlling the combustion in the presence of gaseous fuels having significantly different Wobbe indexes and variable with time.

2. Description of the Related Art

The use of gas turbines, normally consisting of a multiphase compressor, in which the air sucked from the outside is compressed, a combustion chamber, in which the combustion takes place of gaseous fuel added to the compressed air, and a turbine or expander, in which the gases coming from the combustion chamber are expanded, is known for the production of electric energy. The turbine is then capable of generating mechanical energy which can be exploited for activating operating machines or for feeding electric generators.

There are various types of gases or gaseous mixtures which can be used as fuel in a gas turbine. The calorific value and consequently the energy which each gas or gaseous mixture is capable of developing inside a same combustion chamber can therefore vary considerably. The temperature of the gas, or gaseous mixture, used as fuel is also capable of significantly influencing the performances of a gas turbine.

The use of a parameter called "Wobbe index" is known for measuring the heat which is produced by a gas, or mixture of gases, when it is burnt at a constant supply pressure. It is equivalent to the ratio between the upper calorific value (or lower) of the gas and the square root of the relative density of the gas, measured with respect to the air, on the basis of the following formula:

$$I_w = \frac{PC}{\sqrt{T_G * G_s}}$$

wherein:

$I_W$=Wobbe index;

PC=calorific value (upper or lower) of the gas;

$T_G$=temperature of the gas;

$G_S$=relative density (or specific gravity) of the gas.

The heat produced by a gas is therefore directly proportional to the Wobbe index, as well as to the area of the nozzle of the turbine from which the gas used as fuel exits. The Wobbe index is consequently an important parameter for determining the interexchangeability of different gases which can be used as fuels in a certain gas turbine.

Most low-emission gas turbines are currently configured for operating with gaseous fuels having small differences in terms of Wobbe index. The use of different fuels, i.e. having high variations in the Wobbe index, in the same turbine can in fact lead to irregular combustion processes which can cause malfunctioning of the turbine itself, reduction in the operative cycle of the components of the combustion system and possible interruptions in the generation of energy.

BRIEF SUMMARY OF THE INVENTION

One of the advantageous features of the disclosed subject matter is therefore to provide a method and apparatus for controlling the combustion of a gas turbine which is capable of effectively solving the drawbacks mentioned above.

In particular, another of the advantageous features of the disclosed subject matter is to provide a method and apparatus for controlling the combustion of a gas turbine which allows the use of gaseous fuels having significantly different Wobbe indexes, and therefore calorific values, and variable with time, without jeopardizing the performances of the turbine itself and maintaining the same geometry of the combustion chamber.

A further advantageous feature of the invention is to provide a method and apparatus for controlling the combustion of a gas turbine which allows the type of gaseous fuel fed to the turbine itself, to be rapidly varied.

Another advantageous feature of the invention is to provide a method and apparatus for controlling the combustion of a gas turbine which allows the turbine itself to function correctly also mixing two different gas fuels having a different Wobbe index, in arbitrary proportions and variable with time.

Yet another advantageous feature of the present invention is to provide a method and apparatus for controlling the combustion of a gas turbine which allows the turbine itself to deal with brusque variations (load sheds) in the power required by all the connections to the turbine.

On the basis of a first aspect of the present invention, a method for controlling the combustion in a gas turbine comprises the following phases:

measuring, by means of one or more appropriate instruments such as for example calorimeters or gas-chromatographs, the temperature, calorific value and relative density of a gaseous fuel in order to determine the Wobbe index;

comparing the Wobbe index value measured with a predefined Wobbe index value for the gaseous fuel; and regulating the temperature of the gaseous fuel by means of at least one heat exchanger (30) in order to reach the predefined Wobbe index value.

Another aspect of the present invention relates to the apparatus for controlling the combustion in a gas turbine of the type comprising at least one compressor, capable of compressing the air introduced therein through an inlet duct, at least one combustion chamber, in which the compressed air is mixed with a gaseous fuel coming from a supply duct, and at least one turbine, capable of transforming the energy of the gas coming from the combustion chamber into work energy which can be exploited for activating one or more operating machines. The apparatus comprises at least one heat exchanger, situated along the supply duct of the gaseous fuel and capable of heating said gaseous fuel, and one or more instruments, such as for example calorimeters or gas-chromatographs, for measuring the Wobbe index of the gaseous fuel.

BRIEF DESCRIPTION OF THE DRAWINGS

The characteristics and advantages of a method and apparatus for controlling the combustion in a gas turbine according to the present invention will appear more evident from the following illustrative and non-limiting example, referring to the enclosed schematic drawings, in which.

DETAILED DESCRIPTION OF THE PREFERRED EMBODIMENTS

Figure 1:
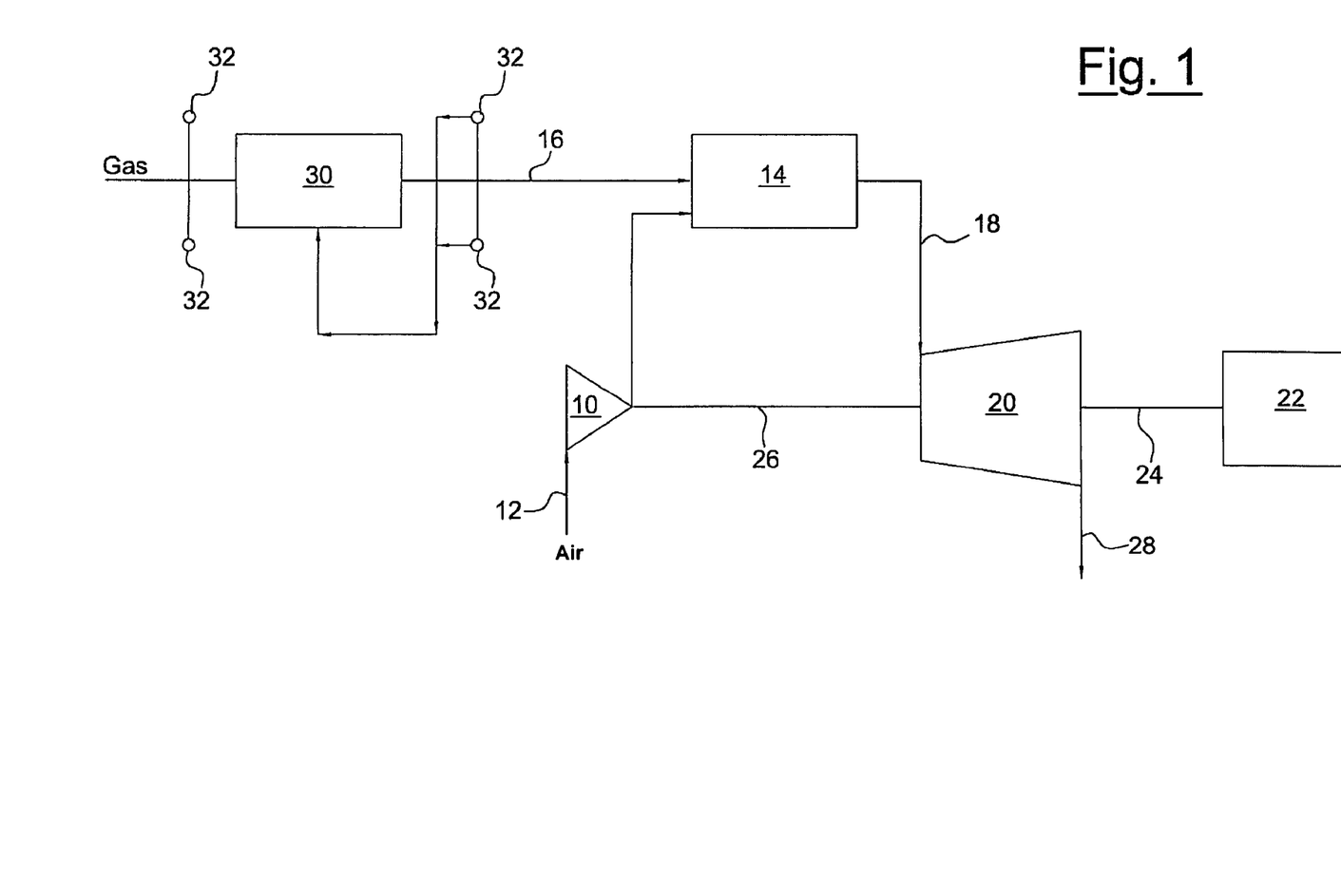
FIG. 1 is a schematic illustration of a gas turbine equipped with an apparatus for controlling the combustion according to the present invention.

With reference in particular to FIG. 1, this schematically shows a generic gas turbine, comprising a compressor 10 capable of compressing air introduced therein through an inlet duct 12. The compressed air is then sent to a combustion chamber 14 to be mixed with the gaseous fuel coming from a supply duct 16. The combustion increases the temperature, the rate and volume of the gas flow and consequently the energy contained therein. Said gas flow is directed, through a duct 18, towards a turbine 20, which transforms the energy of the gas into work energy which can be exploited for activating operating machines, such as for example a generator 22 connected to the turbine 20 by means of a shaft 24. The turbine 20 also supplies the energy necessary for activating the compressor 10 through the relative shaft 26, whereas the discharge gases are expelled from the turbine 20 through an outlet duct 28.

According to the invention, there is at least one heat exchanger 30 on the supply duct 16 of the gaseous fuel, capable of heating the gaseous fuel, as better specified hereunder, together with one or more instruments 32 for measuring the Wobbe index, such as for example calorimeters or gas-chromatographs, situated upstream and downstream of the above heat exchanger 30. Thanks to the above devices, it is possible to continuously regulate the heating of the gaseous fuel in order to guarantee the most appropriate Wobbe index value relating to the fuel itself. In the case of a rapid change in the supply with a fuel having a different Wobbe index, the system also allows the components of the gas turbine to be actively controlled in order to minimize the impact due to this supply change.

Figure 2:
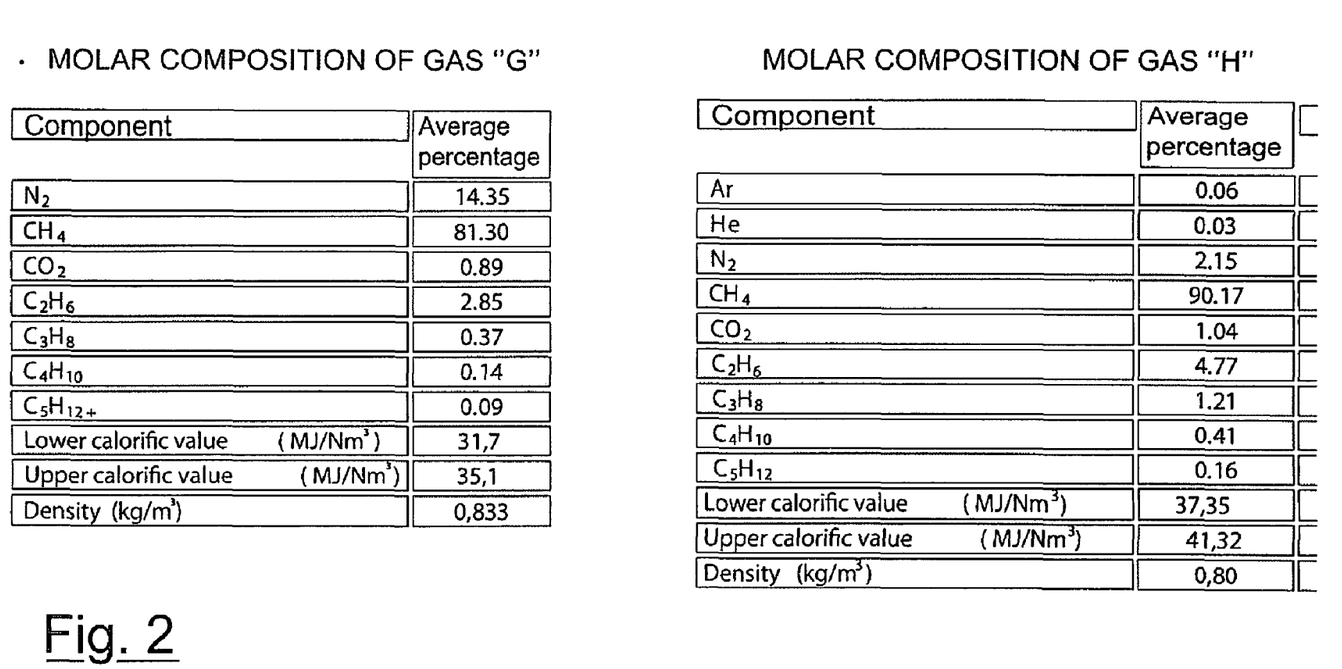
FIG. 2 indicates the tables containing the values relating to the molar composition, calorific value and density of two example mixtures of fuel gas.

With reference to the block schemes of FIGS. 3-6 and two illustrative typologies of fuel gas mixtures, indicated in the tables of FIG. 2, a description follows of the method for controlling the combustion according to the present invention.

FIG. 2 compares two gaseous fuels commonly used in gas turbines. The fuel indicated with "H" is characterized by a maximum Wobbe index value equal to 53.673 MJ/Nm$^3$ and a low content of inert products. The fuel indicated as "G", used less frequently as an alternative to the fuel H, is characterized, on the other hand, by a maximum Wobbe index value equal to 44.3 MJ/Nm$^3$ and a slightly higher content of inert products (about 15%) with respect to the fuel H.

Figure 3:
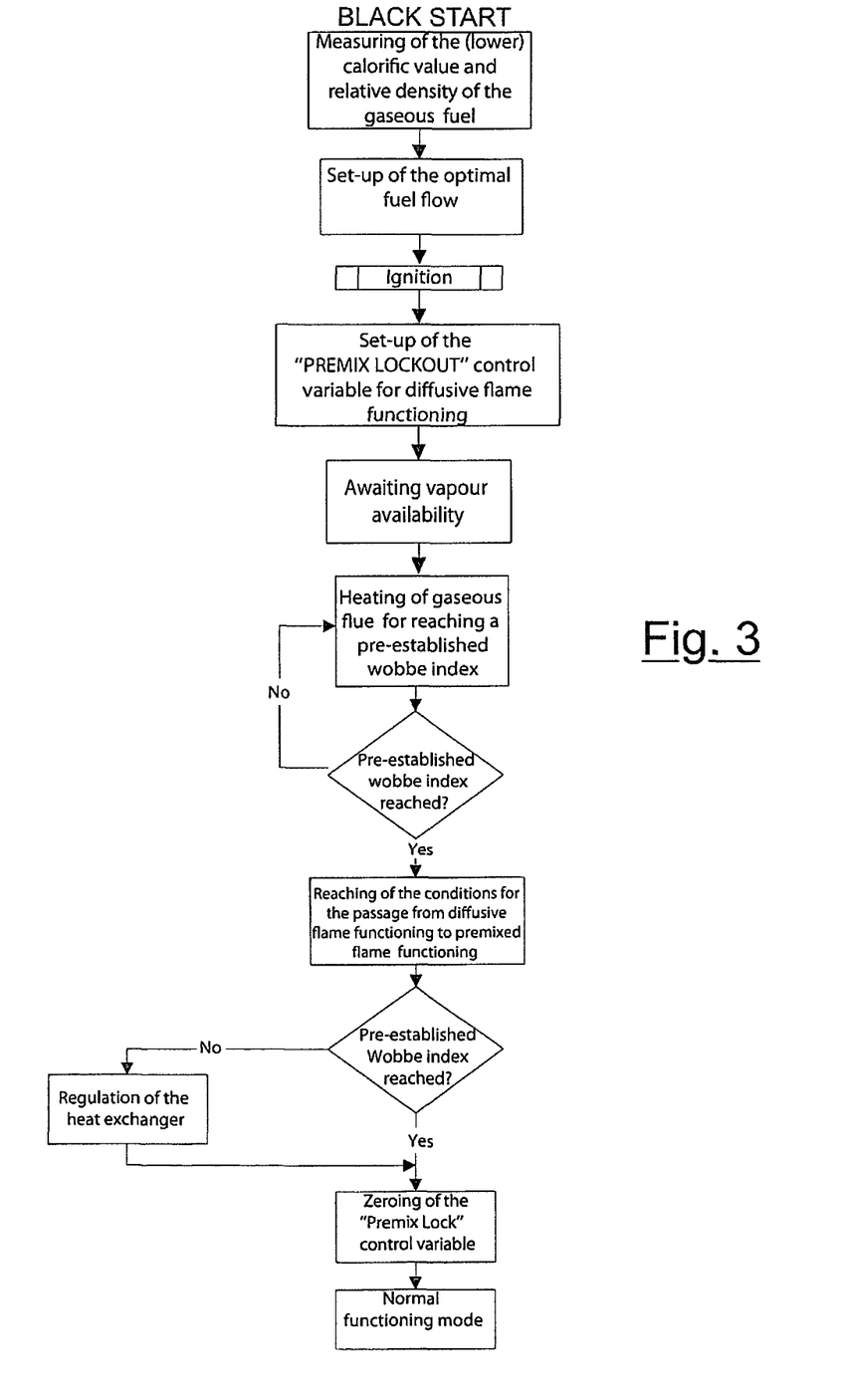
FIG. 3 is a block scheme which illustrates the method for controlling the combustion of a gas turbine according to the invention, under so-called "black start" conditions.

In the block scheme of FIG. 3 a method is represented for controlling the combustion in a gas turbine according to the present invention, under conditions which in technical jargon are called "black start", i.e. when the gas turbine is restarted after the whole plant has been disconnected from the electric supply. Under these conditions, the vapour necessary for heating the gaseous fuel is not available and the turbine must be able to be started with cold fuel.

The method envisages an initial phase in which the temperature, calorific value (lower) and relative density of the gaseous fuel used, for example the fuel "H", having a particularly high Wobbe index, are measured, by means of calorimeters 32. Once the optimum fuel flow to be sent to the combustion chamber 14 has been established, the ignition phase of the gas turbine takes place which, as already specified, is effected with cold fuel (from about −5° C. to about 25° C.).

The normal functioning of the machine takes place by premixing air with the gaseous fuel, but this phase is reached after the above ignition phase, which is effected with a diffusive flame. There is consequently the setting phase of a "premix lock-out" Boolean control variable capable of inhibiting or not inhibiting the transfer from diffusive flame (ignition phase) to premixed flame (normal functioning).

The machine therefore waits until a certain quantity of vapour becomes available for heating the gas. This can last for from 1 to 4 hours, if the boiler for the vapour production has already reached a certain temperature, or from 6 to 8 hours if the boiler still has to be activated. When vapour is available, the heat exchanger 30 begins to heat the gaseous fuel up to a temperature ranging from about 125° C. to about 165° C., these values being measured in correspondence with the combustion chamber 14. When the heating is completed, there should be a corresponding variation in the Wobbe index of the gas which, in the case of the fuel H, is equal to about 2.5% of the initial value of the index itself. When this Wobbe index value, predefined on the basis of the increase in temperature of the gas, has been reached, the conditions will also be reached in which the passage from diffusive flame to premixed flame is possible (the latter being characterized by lower polluting emissions).

Subsequently, a further control that the predefined Wobbe index has been reached will allow, if the result is positive, the "premix lock-out" Boolean control variable to be zeroed, in order to establish the normal functioning mode of the machine. If the predefined Wobbe index value has not been reached, the heat exchanger 30 will have to be regulated in order to allow the normal functioning conditions to be respected.

Figure 4:
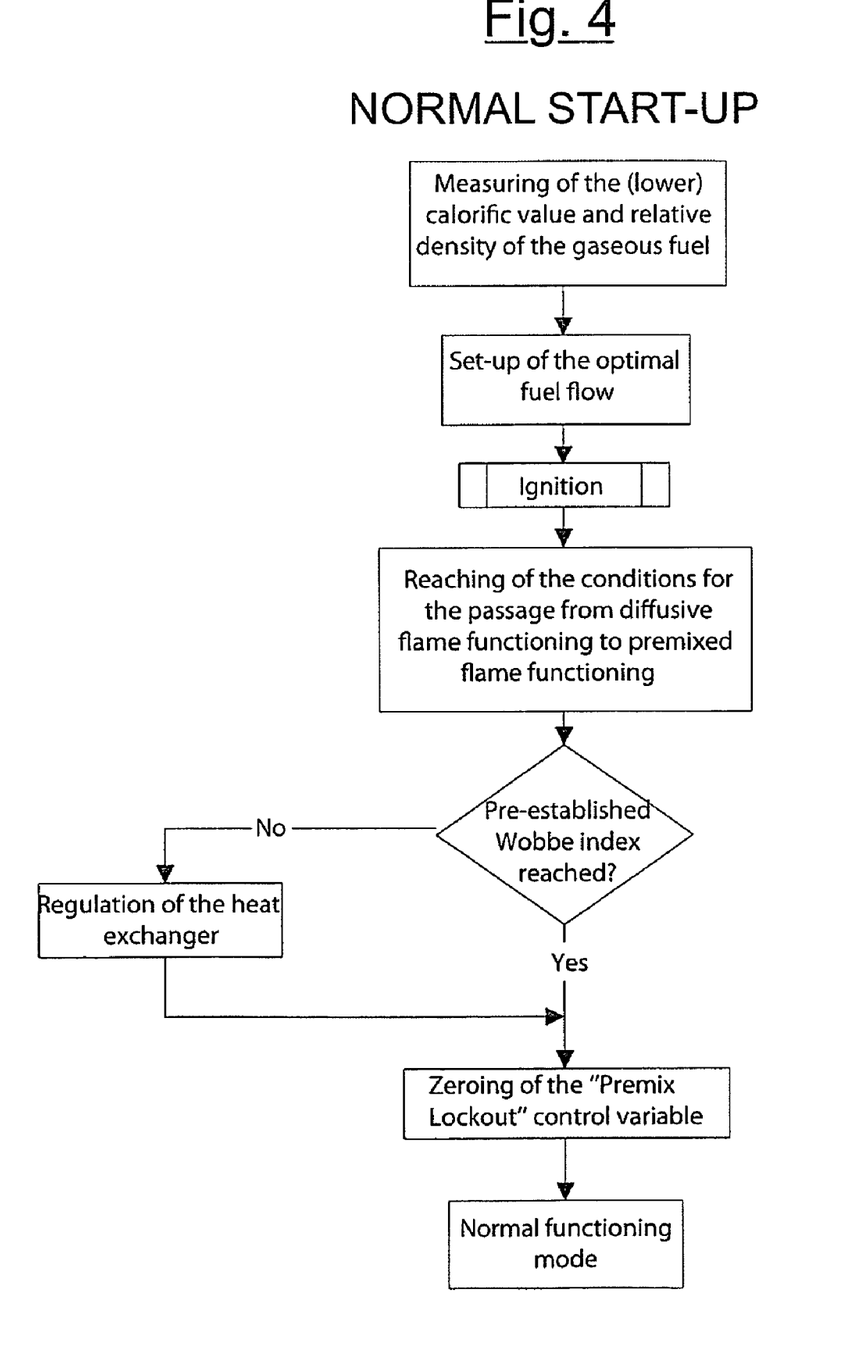
FIG. 4 is a block scheme which illustrates the method for controlling the combustion of a gas turbine according to the invention, under normal start-up conditions.

The block scheme of FIG. 4 represents a method for controlling the combustion in a gas turbine according to the present invention, under normal start-up conditions. Under these conditions, the intervention of the heat exchanger 30 is not required for regulating the heating vapour of the gas in the start-up phase of the turbine. The control method is therefore similar to that effected under "black start" conditions, unless the standby phase of vapour availability and subsequent control phase that the Wobbe index which has varied after the heating of the gas, has been reached, are not effected.

In general, under all the start-up conditions of the gas turbine and in the presence of any kind of gas mixtures, the method always envisages the automatic set-up of the optimal fuel on the basis of temperature, calorific value and relative density of the gaseous fuel, measured by calorimeters 32.

Figure 5:
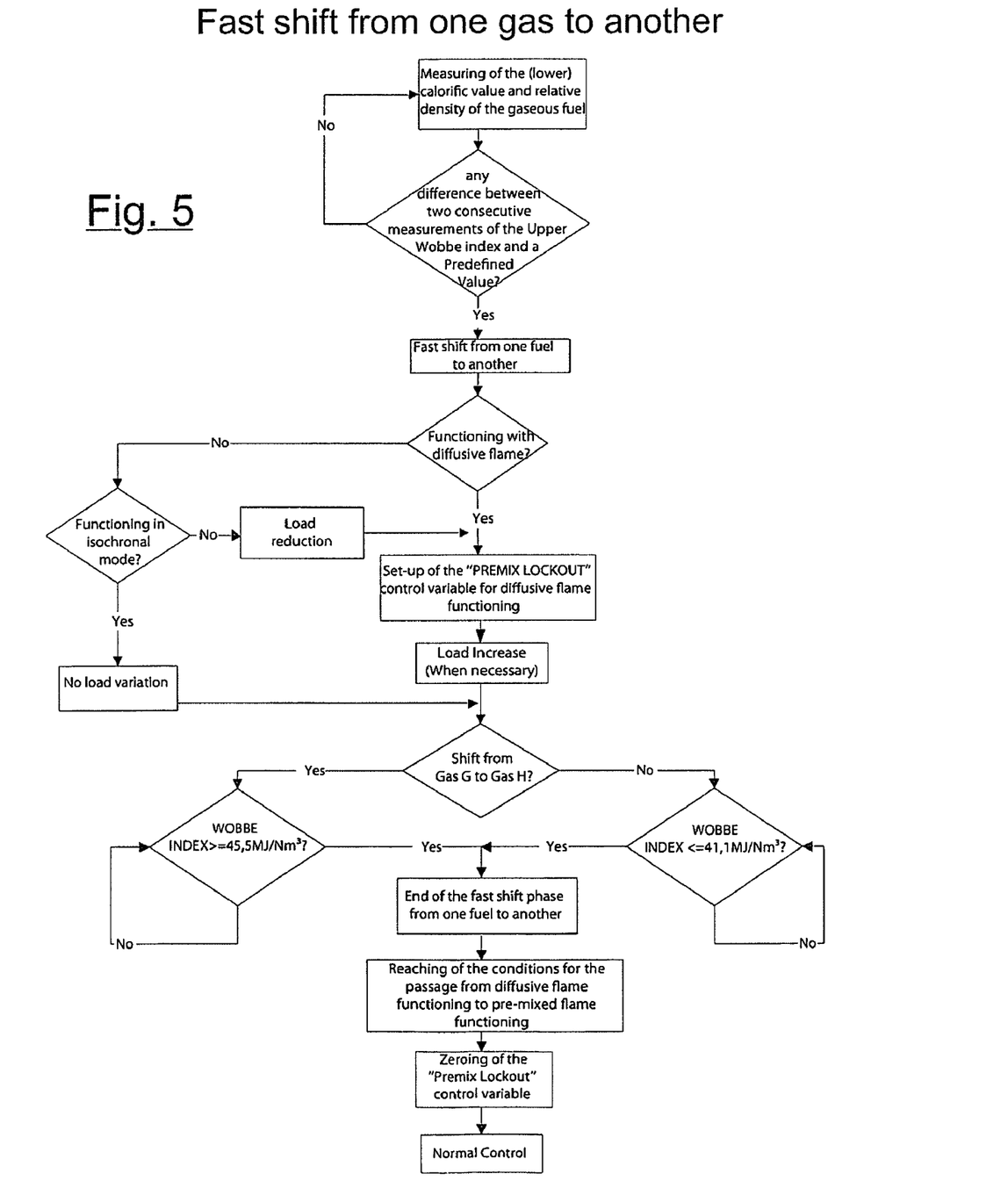
FIG. 5 is a block scheme which illustrates the method for controlling the combustion of a gas turbine according to the invention, under rapid passage conditions from one gas fuel to another.

The block scheme of FIG. 5 illustrates the method for controlling the combustion in a gas turbine according to the present invention under rapid passage conditions from one gaseous fuel to another. It is possible to feed the turbine 20 passing from one single fuel to another, such as for example from the fuel G to the fuel H, or the two fuels can be mixed in variable proportions.

After measuring, again by means of calorimeters 32, the temperature, calorific value (lower) and relative density of the inflow of gaseous fuel, the data of the two consecutive measurements are compared. If the difference between two consecutive measurements of the Wobbe index is equal to or higher than the difference between the Wobbe indexes of the two gases, for example G and H, used as fuels in the turbine, the machine is put under rapid passage conditions from one fuel to another. At this point, a control procedure is effected of the combustion mode of the machine and, on the basis of the result of the control, the value of the electric power supplied by the machine will consequently be regulated.

Once the rapid passage from one fuel to another has been effected, for example from the gas G to the gas H, the Wobbe index will be calculated again for verifying whether the machine is actually operating with the new fuel. If this condition has been satisfied, it will then be possible to pass to mixed-flame functioning and to set-up the normal functioning mode of the machine.

Figure 6:
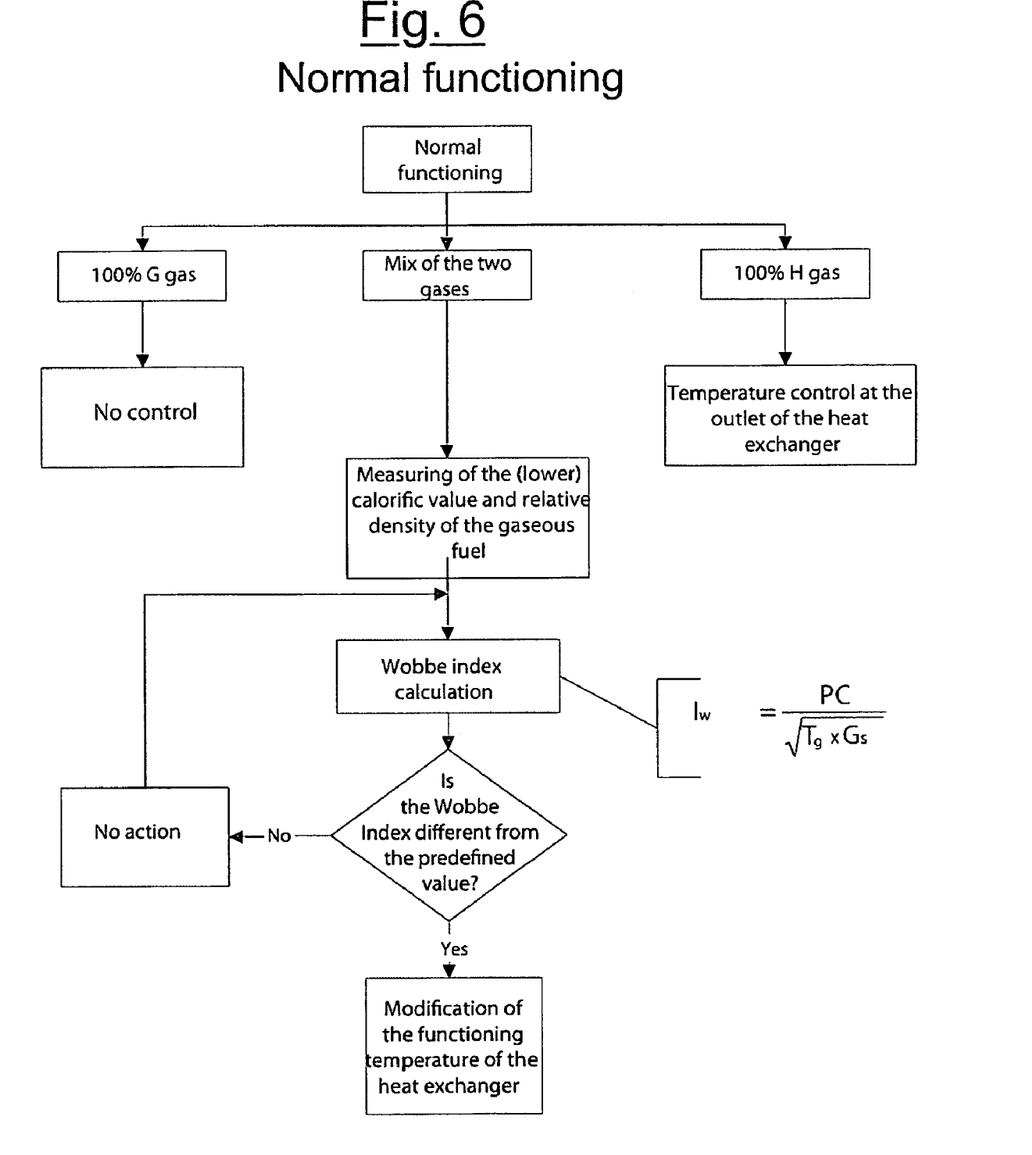
FIG. 6 is a block scheme which illustrates the method for controlling the combustion of a gas turbine according to the invention, under normal functioning conditions.

The block scheme of FIG. 6 illustrates the normal functioning modes of the gas turbine on the basis of the type of fuel used. In the case of supply with fuel G, which does not have a particularly high Wobbe index and does not need to be heated by the heat exchanger 30 to allow the turbine to operate correctly, it is not necessary to effect any control of the parameters relating to the Wobbe index. In the case of supply with fuel H, on the other hand, it is necessary to control the temperature downstream of the heat exchanger 30.

If the turbine is fed with a mixture of fuel gases, in the case of a combination of fuels G and H, the calorimeters 32 will measure the temperature, calorific value (lower) and relative density of the mixture to determine the Wobbe index of the mixture itself. If the Wobbe index differs from the predefined value for the mixture being used, the functioning temperature of the heat exchanger 30 will be modified.

The system proposed can absorb, without waiting for the temperature regulation effected by the heat exchanger 30, required power variations of up to 6 electric MW. The system is therefore capable of sustaining almost instantaneous required power changes of up to 6 electric MW.

It can thus be seen that the method and apparatus for controlling the combustion in a gas turbine according to the present invention achieves the objectives specified above. In particular, the turbine is able to operate indifferently both with gaseous fuels having a significantly different Wobbe index, and also with a mixture of these according to arbitrary proportions, and is also able to rapidly pass from one fuel to another and also absorb brusque load sheds.

The method and apparatus for controlling the combustion in a gas turbine of the present invention thus conceived can in any case undergo numerous modifications and variants, all included in the same inventive concept. The protection scope of the invention is therefore defined by the enclosed claims.

The invention claimed is:

1. A method for controlling the combustion in a gas turbine comprising at least one compressor, capable of compressing air introduced therein through an inlet duct, at least one combustion chamber, in which said compressed air is mixed with a gaseous fuel coming from a supply duct, and at least one turbine, capable of transforming energy of the gas coming from said combustion chamber into work energy which is exploited for activating one or more operating machines, the method comprising:

measuring, with one or more measurement instruments, the temperature, calorific value and relative density of said gaseous fuel in order to determine a Wobbe index, $I_w$, said Wobbe index being defined as:

$$I_w = \frac{PC}{\sqrt{T_G * G_s}}$$

where PC is an upper or lower calorific value of said gaseous fuel, $T_G$ is the temperature of said gaseous fuel, and $G_S$ is the specific gravity of said gaseous fuel;

comparing the Wobbe index value measured with a predefined Wobbe index value for said gaseous fuel;

regulating the temperature of said gaseous fuel with at least one heat exchanger in order to reach said predefined Wobbe index value; and changing, based on said Wobbe index value, a functioning of the gas turbine from a diffusive flame to a premixed flame, wherein the diffusive flame is present during an ignition phase of the gas turbine while the premixed flame is present during normal functioning of the gas turbine.

2. The method according to claim 1, further comprising:

feeding said combustion chamber with a second gaseous fuel having a different Wobbe index with respect to that of said gaseous fuel;

measuring, with said instruments, the temperature, calorific value and relative density of said second gaseous fuel in order to determine its Wobbe index;

comparing the Wobbe index value measured for said second gaseous fuel with the Wobbe index value measured for said gaseous fuel; and effecting a control procedure of a combustion mode of said turbine and of an electric power value which is supplied by said at least one turbine if a difference between two consecutive measurements of the Wobbe index value for one or more of said gaseous fuel and said second gaseous fuel is equal to or higher than a difference between the Wobbe indexes of said gaseous fuel and said second gaseous fuel.

3. The method according to claim 1, further comprising:

feeding said combustion chamber with a mixture including proportions variable with time of said gaseous fuel and a second gaseous fuel having a different Wobbe index with respect to that of said gaseous fuel;

measuring, with said instruments, the temperature, calorific value and relative density of said mixture in order to determine its Wobbe index;

comparing the Wobbe index value measured for said mixture with a predefined Wobbe index value for said mixture; and regulating a temperature of said mixture with said heat exchanger in order to reach said predefined Wobbe index value for said mixture.

4. The method according to claim 1, further comprising:

measuring, during a start-up operation of the gas turbine, with said one or more measurement instruments, the temperature, calorific value and relative density of said gaseous fuel in order to determine a Wobbe index;

setting up an optimal fuel flow; and igniting the fuel flow, wherein all these steps are performed prior to said step of changing.

5. The method according to claim 2, further comprising:

fast shifting from said gaseous fuel to said second gaseous fuel.

6. The method according to claim 1, further comprising:
starting the gas turbine with cold fuel;
setting up an optimal flow of the cold fuel;
igniting the cold fuel in the combustion chamber; and
using the diffusive flame for the cold fuel.

7. The method according to claim 6, further comprising:
receiving vapor at the at least one heat exchanger for increasing the temperature of cold fuel.

8. The method according to claim 1, further comprising:
feeding said combustion chamber with a mixture including proportions variable with time of said gaseous fuel and a second gaseous fuel having a different Wobbe index with respect to that of said gaseous fuel;
measuring, with one or more measurement instruments, the temperature, calorific value and relative density of said mixture in order to determine a Wobbe index of the mixture;
comparing the measured Wobbe index of the mixture with the predefined Wobbe index value; and
regulating the temperature of the mixture with the at least one heat exchanger to reach said predefined Wobbe index value.

\* \* \* \* \*